Dec. 5, 1961 F. A. CARLSON, JR 3,011,217
METHOD FOR PREPARING HIGH DENSITY SHEETS OF
FOAMABLE THERMOPLASTIC RESIN COMPOSITIONS
Filed May 11, 1959 2 Sheets-Sheet 1
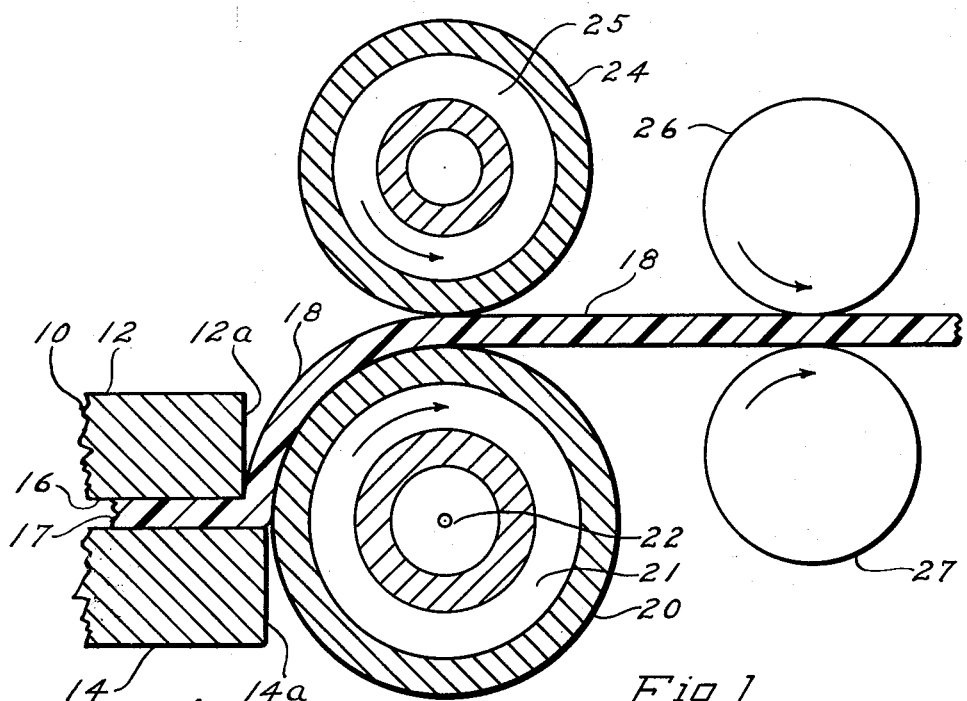
Fig. 1.
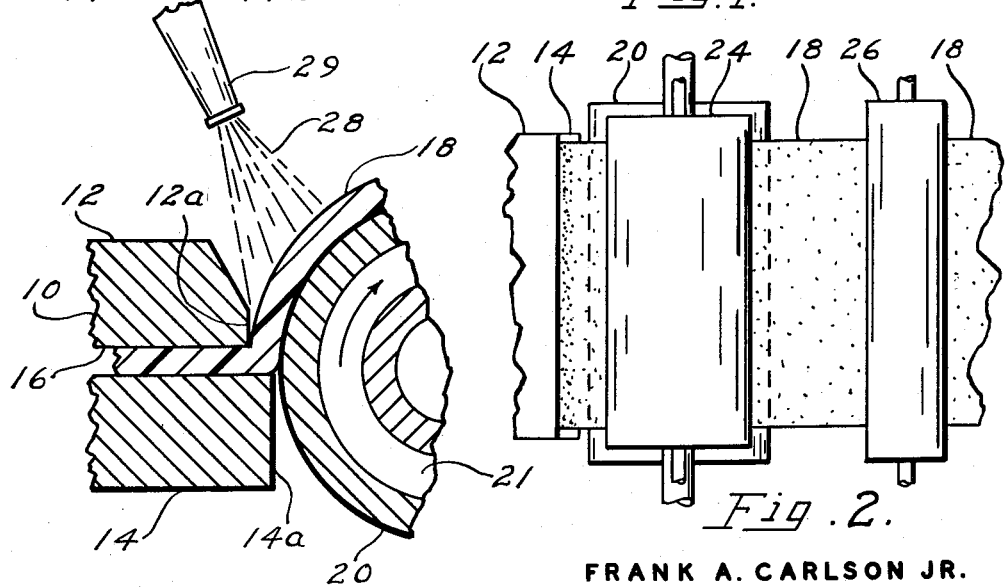
Fig. 2.
Fig. 3.
FRANK A. CARLSON JR.
INVENTOR.
BY *Richard T. Kelly*
ATTORNEY Dec. 5, 1961 F. A. CARLSON, JR 3,011,217
METHOD FOR PREPARING HIGH DENSITY SHEETS OF
FOAMABLE THERMOPLASTIC RESIN COMPOSITIONS
Filed May 11, 1959 2 Sheets-Sheet 2
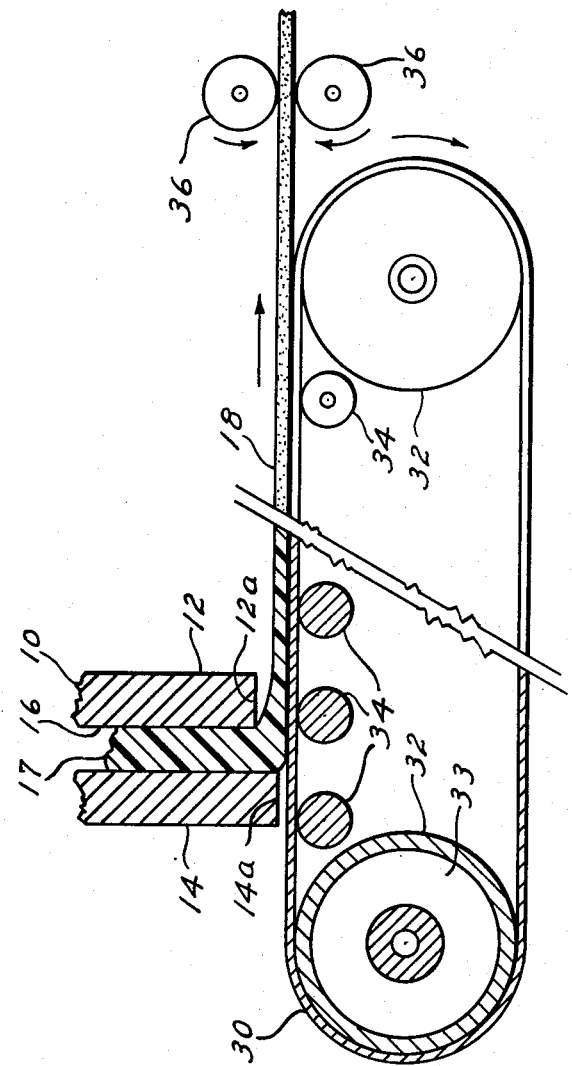
FRANK A. CARLSON JR. *INVENTOR.*
BY *Richard L. Kirby*
ATTORNEY

United States Patent Office 3,011,217
Patented Dec. 5, 1961

3,011,217
METHOD FOR PREPARING HIGH DENSITY SHEETS OF FOAMABLE THERMOPLASTIC RESIN COMPOSITIONS
Frank A. Carlson, Jr., Springfield, Mass., assignor to Monsanto Chemical Company, St. Louis, Mo., a corporation of Delaware
Filed May 11, 1959, Ser. No. 812,373
8 Claims. (Cl. 18—55)

The present invention relates to methods for preparing high density sheets of foamable thermoplastic resin compositions.

Sheets of foamed thermoplastic resins such as foamed polystyrene are low density materials having high strength/weight ratios and excellent insulating properties. As such, they are finding increasingly wide use in industry. Because of their high volume/weight ratio, such foamed thermoplastic resin sheets are expensive to ship and economic considerations make it imperative that such foamed sheets be prepared at locations that are close to sites of consumption. The manufacture of foamed thermoplastic resin sheets requires moderately expensive equipment and specialized skills not available to many plastic converters. In view of these facts, it would be desirable to have available to the art high density sheets of foamable thermoplastic resin compositions, which high density sheets could be foamed to their ultimately desired low density by a simple heating operation.

One object of this invention is to provide a method for preparing high density sheets of foamable thermoplastic resin compositions.

Other objects and advantages of the invention will be apparent from the following detailed description thereof when read in conjunction with the accompanying drawings in which:

FIG. 1 is a side elevation partially in section of one form of apparatus for preparing a sheet of a foamable thermoplastic resin composition, FIG. 2 is a top plan view of the apparatus illustrated in FIG. 1, FIG. 3 is a side elevation partially in section of a modified form of the apparatus illustrated in FIG. 1 in which means are provided for spraying a liquid coolant on the exposed surface of the extruded sheet of foamable thermoplastic resin composition, and FIG. 4 is a side elevation partially in section of another form of apparatus for preparing a sheet of foamable thermoplastic resin composition.

The apparatus provided by the present invention comprises the cooperative assembly of (1) a sheet die having a die land aperture not greater than about 0.060 inch thick, the die lips thereof being of unequal length so that the sections of the die faces which define the die land aperture are separated by a distance of about 0.001–0.040 inch, (2) an endless rigid arcuate to flat surface which lies in virtually touching relationship with the longer die lip at the die land aperture, (3) means for driving the endless rigid surface in a direction such that it first passes the longer die lip, and (4) means for cooling the endless rigid surface.

To prepare high density sheets of foamable thermoplastic resin compositions, a foamable thermoplastic resin composition is extruded from an apparatus of the type above described and the endless rigid surface is moved past the die land to convey the extruded foamable thermoplastic resin composition away from the die land as fast as melted foamable thermoplastic resin composition is forced into the die land. The endless rigid movable surface is cooled throughout the operation so as to maintain its temperature below about 100° F.

Referring to FIGS. 1 and 2, 10 represents a sheet die containing die lips 12 and 14 which define a die land 16 of uniform thickness therebetween. Die lip 14 is somewhat longer than die lip 12 so that die face 14a and die face 12a lie in separate but parallel planes. Except for the differential lengths of die lips 12 and 14, the construction of sheet die 10 is conventional and, accordingly, not shown in detail. Sheet die 10 is affixed to a conventional rotary screw extruder (not shown).

A heavy rigid roll 20 is positioned immediately in front of the aperture of die land 16 so that it is in virtually touching relationship with die face 14a. The center of rotation 22 of roll 20 lies in a common plane with die land 16. A chamber 21 is provided in roll 20 so that a liquid coolant can be circulated therethrough to remove heat from the surface of roll 20. Rolls 24, 26 and 27 are provided and cooperate with roll 20 in conveying the extruded resin sheet to a wind up roll (not shown). Roll 24 is provided with a chamber 25 through which a liquid coolant can be circulated to assist in cooling the roll's surface.

In operation, a melted foamable thermoplastic resin composition 17, e.g., polystyrene containing 5–8% pentane, is delivered into die land 16 by a rotary screw extruder (not shown). The melted foamable thermoplastic resin composition is at a temperature well above its foaming temperature, e.g., 275–325° F., but foaming within the die land is prevented by the high pressure under which the melted resin composition is maintained. As the melted resin composition 17 is discharged from die land 16 it contacts the surface of roll 20 and is immediately cooled. Thus, the rotation of roll 20 conveys a high density resin sheet 18 away from die land 16. Rolls 24, 26 and 27 cooperate with roll 20 in drawing the resin sheet away from the die land and delivering it to a wind up roll (not shown). In viewing FIG. 1 it is seen that as roll 20 rotates in virtually touching relationship with die face 14a so as to seal die land 16, the actual orifice of the extrusion apparatus is the small opening which exists between die face 12a and the surface of roll 20.

FIG. 3 illustrates a modification of the apparatus of FIG. 1 in which a fine spray 28 of water from nozzle 29 is directed against the exposed surface of resin sheet 18 to assist in cooling the foamable resin composition. A corner is cut away from die lip 12 to enable the spray 28 to contact resin sheet 18 as soon as it is conveyed away from the resin melt in die land 16.

FIG. 4 illustrates a modification of the apparatus of FIG. 1 in which an endless stainless steel belt 30 is employed to convey the resin sheet 18 away from die land 16. Belt 30 is driven by rolls 32—32 and is supported in virtually touching relationship with die face 14a by idling rolls 34—34. Rolls 32—32 are provided with chambers 33—33 through which cooling liquids can be circulated to cool endless belt 30. Driving rolls 36—36 are provided to convey resin sheet 18 to a wind up roll (not shown).

The following example is set forth to illustrate more clearly the principle and practice of this invention to those skilled in the art.

*Example*

A flat sheet of foamable polystyrene is prepared employing the apparatus illustrated in FIGS. 1 and 2. The distance between the parallel planes in which die faces 12a and 14a lie is about 0.005" and the aperture of die land 16 measures 8" x 0.012". Roll 20 is 16 inches in length and 4 inches in diameter and its surface is chrome plated. The center of rotation 22 of roll 20 is aligned in the same plane as die land 16 and roll 20 is positioned so that the clearance between roll 20 and die face 14a is about 0.002". A styrene homopolymer of 60,000 molecular weight which has dispersed therein about 7% by weight of pentane as a foaming agent is extruded from the apparatus at a temperature of about 300° F. and at a rate of about 30 lbs./hour. Roll 20 is rotated at a speed of about 12 revolutions/minute and its surface temperature is maintained at about 70° F. by circulating cold water through chamber 21. Foamable polystyrene sheet 18 is delivered from rolls 26—26 at a rate of about 10 ft./minute. The finished sheet is 8 inches wide, 0.015 inch thick and has a density of about 60 lbs./cu. ft.

A foamed polystyrene sheet measuring 28" x 0.075" and having a density of 2 lbs./cu. ft. is prepared by passing the above described high density foamable polystyrene sheet through a steam chest 6 ft. long at a throughput rate of 10 ft./minute.

The critical structural features of the apparatus of the invention are:

(1) The thickness of the die land aperture,
(2) The distance provided between the faces of the two die lips,
(3) The geometry of the rigid surface and its positioning with respect to the face of the longer die lip,
(4) The direction in which the rigid surface is driven past the die land aperture, and
(5) The provision of means for cooling the rigid surface.

The die employed in the apparatus must have a sheet like aperture whose maximum thickness is not greater than about 0.060 inch and preferably not greater than about 0.030 inch. If desired, teeth may be spaced along the length of the die aperture so that a plurality of narrow ribbons or foils can be prepared in lieu of a single sheet. The die lips must be of unequal length so that the sections of the faces of the two die lips which define the die land aperture are separated by a distance of about 0.001–0.040 inch and preferably by about 0.005–0.020 inch.

The endless rigid surface provided in the apparatus to convey the foamable thermoplastic resin composition from the aperture of the die land must be arcuate to flat. Where an arcuate rigid surface is employed, it is preferred that the surface have a radius of curvature of at least about 1 inch. Although a flat belt and a roll have been illustrated in the drawings as examples of the rigid surface, it is obvious that many other types and forms of rigid surfaces can be employed.

The rigid surface must be positioned so that it is in virtually touching relationship with the face of the longer die lip at the die land aperture. The clearance between the rigid surface and the die face should be as small as is consonant with the requirement for driving the rigid surface past the die face. Normally this clearance will be less than about 0.01 inch and preferably less than 0.005 inch. The rigid surface normally will be fabricated from a metal such as stainless steel although it is also feasible to employ hard rubbers, high melting plastics and the like for this purpose. Frequently, the rigid surface will carry a coating of polytetrafluoroethylene or the like to minimize adhesion between the extruded foamable thermoplastic resin sheet and the rigid surface.

The driving means included in the apparatus may be of any conventional type provided only that they function to drive the rigid surface in a direction such that it first passes the longer die lip. Means also are provided to cool the rigid surface so as to maintain its temperature below about 100° F. and preferably below about 70° F.

In a preferred embodiment of the invention the faces of the two die lips lie in parallel planes which are substantially perpendicular to the plane of the die land. The endless rigid arcuate to flat surface also lies in a plane substantially perpendicular to the plane of the die land as it is moved past the longer die lip.

In addition to the essential features previously described, certain optional components frequently will be employed in conjunction with the apparatus of the invention. For example a cooling bath or a series of cooling rolls may be used to further cool the resin sheet after it leaves contact with the endless rigid surface.

In operation of the process, the foamable thermoplastic resin composition is delivered into the die land at a temperature well above its foaming temperature. The back pressure generated within the apparatus, however, prevents any foaming of the resin within the die. The rigid surface is driven past the die land aperture at such a speed that a sheet of the foamable thermoplastic resin composition is conveyed away from the die land at substantially the same speed as the melted foamable thermoplastic resin composition is fed into the die land. When it contacts the cooled rigid surface, the melted foamable thermoplastic resin composition is substantially immediately cooled to below its foaming temperature and to a solid state. As a result of this action, the solidified resin composition adheres to the roll and is withdrawn from the melted resin composition present in the die land. If desired, the exposed surface of the resin sheet which adheres to the rigid surface can be sprayed with water (or any other liquid which has no solvent action on the resin) to assist in cooling the resin sheet below its foaming temperature. This additional cooling action usually is not required except when the thickness of the die land aperture is set at close to its maximum operational thickness.

The foamable thermoplastic resin compositions which can be extruded by the method and apparatus of this invention consist of a thermoplastic resin and a suitable foaming or pore-forming agent. Examples of thermoplastic resins that may be employed include cellulose ethers and esters, e.g., ethyl cellulose, cellulose acetate; homopolymers and interpolymers of monomeric compounds containing the $CH_2=C<$ grouping such as olefins, e.g., ethylene, isobutylene; vinyl halides, e.g., vinyl chloride; vinylidene chloride; vinyl esters of carboxylic acids, e.g., vinyl acetate, vinyl butyrate, vinyl stearate, vinyl benzoate; vinyl ethers, e.g., vinyl methyl ether, vinyl ethyl ether, vinyl isobutyl ether; unsaturated carboxylic acids and derivatives thereof, e.g., acrylic acid, methacrylic acid, methyl acrylate, ethyl acrylate, methyl methacrylate, acrylamide, acrylonitrile, methacrylonitrile, and interpolymers of the above mentioned vinylidene monomers with unsaturated alpha, beta-unsaturated polycarboxylic acids and derivatives thereof, e.g., maleic anhydride, diethyl maleate, dibutyl fumarate, diallyl maleate, dipropyl maleate, etc. In general, optimum results are obtained with rigid, relatively non-elastic thermoplastic resins such as homopolymers and interpolymers of vinyl chloride, homopolymers of vinylidene aromatic hydrocarbon compounds and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene, and interpolymers of such vinylidene aromatic hydrocarbon compounds with other vinylidene monomers in which the interpolymer contains at least 70% of the vinylidene aromatic hydrocarbon compound. It is feasible and sometimes desirable to employ a blend of two or more thermoplastic resins such as a blend of styrene and a rubbery polymer, e.g., natural rubber, butadiene-acrylonitrile rubbers and the like. High impact polystyrene prepared by polymerizing monomeric styrene in the presence of a rubbery diene polymer also may be employed advantageously.

Suitable foaming agents for the thermoplastic resins are well known and the selection of the particular foaming agent to be employed will be dictated largely by the particular thermoplastic resin in which it is to be incorporated. It is preferred to employ as foaming agents non-reactive organic liquids which have not more than a slight solvent action on the thermoplastic resin and which volatilize below the softening point of the thermoplastic resin. Examples of suitable foaming agents that may be employed include pentane, hexane, heptane, petroleum ether, cyclopentane, cyclopentadiene, acetone, methanol, methyl acetate, ethyl acetate, methyl formate, ethyl formate, dichloroethylene, isopropyl chloride, propionaldehyde, and diisopropyl ether. Usually the foaming agent will be employed in the amount of about 3–10 and preferably 5–8 weight percent of the thermoplastic resin.

The above description and particularly the examples are set forth by way of illustration only. It will be obvious to those skilled in the art that many variations and modifications thereof can be made without departing from the spirit and scope of the invention herein described.

What is claimed is:

1. A method for preparing a high density sheet of foamable thermoplastic resin composition which consists essentially of; (1) extruding a foamable thermoplastic resin composition through a sheet die having a die land aperture not greater than about 0.060 inch thick, the die lips of said sheet die being of unequal length so that the sections of the die faces which define the die land aperture are separated by a distance of about 0.001–0.040 inch, (2) conveying a sheet of foamable thermoplastic resin composition away from the die land by moving an endless rigid arcuate to flat surface past the die land in a direction such that the endless rigid surface first passes the longer die lip, said endless rigid surface passing in virtually touching relationhip with the face of the longer die lip at the die land aperture and being moved at such a speed that it conveys the foamable thermoplastic resin composition away from the die land at substantially the same rate as the melted foamable thermoplastic resin composition is forced into the die land, and (3) cooling the endless rigid surface so as to maintain its temperature below about 100° F.; said foamable thermoplastic resin composition comprising a thermoplastic resin and, as a foaming agent, a nonreactive organic liquid which has not more than a slight solvent action on the thermoplastic resin and which volatilizes below the softening point of the thermoplastic resin.

2. The method of claim 1 in which the foamable thermoplastic resin composition comprises a thermoplastic styrene polymer containing at least 70% by weight of styrene in its structure and, as a foaming agent, a liquid aliphatic hydrocarbon which volatilizes below the softening point of the thermoplastic styrene polymer.

3. A method for preparing a high density sheet of foamable thermoplastic resin composition which consists essentially of; (1) extruding a foamable thermoplastic resin composition through a sheet die having a die land aperture not greater than about 0.060 inch thick, the die lips of said sheet die being of unequal length so that the sections of the die faces which define the die land aperture are separated by a distance of about 0.001–0.040 inch, (2) conveying a sheet of foamable thermoplastic resin composition away from the die land by moving an endless rigid arcuate to flat surface past the die land in a direction such that the endless rigid surface first passes the longer die lip, said endless rigid surface passing in virtually touching relationhip with the face of the longer die lip at the die land aperture and being moved at such a speed that it conveys the foamable thermoplastic resin composition away from the die land at substantially the same rate as the melted foamable thermoplastic resin composition is forced into the die land, and (3) cooling the endless rigid surface so as to maintain its temperature below about 100° F., and (4) contacting the exposed surface of the sheet of foamable thermoplastic resin composition with water immediately after it has been conveyed away from the die land; said foamable thermoplastic resin composition comprising a thermoplastic resin and, as a foaming agent, a nonreactive organic liquid which has not more than a slight solvent action on the thermoplastic resin and which volatilizes below the softening point of the thermoplastic resin.

4. The method of claim 3 in which the foamable thermoplastic resin composition comprises a thermoplastic styrene polymer containing at least 70% by weight of styrene in its structure and, as a foaming agent, a liquid aliphatic hydrocarbon which volatilizes below the softening point of the thermoplastic styrene polymer.

5. A method for preparing a high density sheet of foamable thermoplastic resin composition which consists essentially of; (1) extruding a foamable thermoplastic resin composition through a sheet die having a die land aperture not greater than about 0.060 inch thick, the die lips of said sheet die being of unequal length so that the sections of the die faces which define the die land aperture are separated by a distance of about 0.001–0.040 inch, (2) conveying a sheet of foamable thermoplastic resin composition away from the die land by rotating a rigid roll past the die land in a direction such that the roll first passes the longer die lip, said rotating roll passing in virtually touching relationship with the face of the longer die lip at the die land aperture and being rotated at such a speed that it conveys the foamable thermoplastic resin composition away from the die land at substantially the same rate as the melted foamable thermoplastic resin composition is forced into the die land, and (3) cooling the roll surface so as to maintain its temperature below about 100° F.; said foamable thermoplastic resin composition comprising a thermoplastic resin and, as a foaming agent, a nonreactive organic liquid which has not more than a slight solvent action on the thermoplastic resin and which volatilizes below the softening point of the thermoplastic resin.

6. The resin method of claim 5 in which the foamable thermoplastic resin composition comprises a thermoplastic styrene polymer contaning at least 70% by weight of styrene in its structure and, as a foaming agent, a liquid aliphatic hydrocarbon which volatilizes below the softening point of the thermoplastic styrene polymer.

7. A method for preparing a high density sheet of foamable thermoplastic resin composition which consists essentially of; (1) extruding a foamable thermoplastic resin composition through a sheet die having a die land aperture not greater than about 0.060 inch thick, the die lips of said sheet die being of unequal length so that the sections of the die faces which define the die land aperture are separated by a distance of about 0.001–0.040 inch, (2) conveying a sheet of foamable thermoplastic resin composition away from the die land by rotating a rigid roll past the die land in a direction such that the roll first passes the longer die lip, said rotating roll passing in virtually touching relationship with the face of the longer die lip at the die land aperture and being rotated at such a speed that it conveys the foamable thermoplastic resin composition away from the die land at substantially the same rate as the melted foamable thermoplastic resin composition is forced into the die land, (3) cooling the roll surface so as to maintain its temperature below about 100° F., and (4) contacting the exposed surface of the sheet of foamable thermoplastic resin composition with water immediately after it has been conveyed away from the die land; said foamable thermoplastic resin composition comprising a thermoplastic resin and, as a foaming agent, a nonreactive organic liquid which has not more than a slight solvent action on the thermoplastic resin and which volatilizes below the softening point of the thermoplastic resin.

8. The method of claim 7 in which the foamable thermoplastic resin composition comprises a thermoplastic styrene polymer containing at least 70% by weight of styrene in its structure and, as a foaming agent, a liquid aliphatic hydrocarbon which volatilizes below the softening point of the thermoplastic styrene polymer.

References Cited in the file of this patent
UNITED STATES PATENTS

| | | |
|---|---|---|
| 2,256,483 | Johnston | Sept. 23, 1941 |
| 2,289,774 | Graves | July 14, 1942 |
| 2,330,282 | Hazeltine et al. | Sept. 28, 1943 |
| 2,374,069 | Balthis | Apr. 17, 1945 |
| 2,736,066 | Chren et al. | Feb. 28, 1956 |
| 2,765,441 | Gambrill | Oct. 2, 1956 |
| 2,860,378 | Urchick | Nov. 18, 1958 |

FOREIGN PATENTS

| | | |
|---|---|---|
| 142,276 | Australia | July 17, 1951 |

UNITED STATES PATENT OFFICE
CERTIFICATE OF CORRECTION

Patent No. 3,011,217                              December 5, 1961

Frank A. Carlson, Jr.

It is hereby certified that error appears in the above numbered patent requiring correction and that the said Letters Patent should read as corrected below.

In the heading to the drawings, Sheet 1 and 2, and in the heading to the printed specification, line 2, in the title of invention before "METHOD" insert -- A --; column 6, line 48, strike out "resin".

Signed and sealed this 5th day of June 1962.

(SEAL)
Attest:

ERNEST W. SWIDER
Attesting Officer

DAVID L. LADD
Commissioner of Patents